United States Patent [19]

Carp

[11] Patent Number: 4,637,251

[45] Date of Patent: Jan. 20, 1987

[54] SYMMETRICAL BRIDGE CIRCUIT FOR MEASURING MASS AIR FLOW

[75] Inventor: Ralph W. Carp, Newport News, Va.

[73] Assignee: Allied Corporation, Morris Township, Morris County, N.J.

[21] Appl. No.: 830,317

[22] Filed: Feb. 18, 1986

[51] Int. Cl.$^4$ ............................................. G01M 15/00
[52] U.S. Cl. ....................................... 73/118.2; 73/204
[58] Field of Search ................. 73/118.2, 204; 123/494

[56] References Cited

U.S. PATENT DOCUMENTS 4,420,971 12/1983 Rapps et al. .......................... 73/118.2

Primary Examiner—Jerry W. Myracle
Attorney, Agent, or Firm—Russel C. Wells; Markell Seitzman

[57] ABSTRACT

A symmetrical bridge circuit having a sensing leg means and a compensation leg means for measuring mass air flow in the input of an internal combustion engine utilizes the same type of sensing and compensation elements with the same temperature coefficients. The sensing leg means and the compensation leg means are coupound circuits each having a conventional bridge leg and a voltage divider leg. The conventional bridge leg outputs are connected through voltage follower circuits controlling the input of the voltage divider legs. The conventional leg of the sensing leg means contains the sensing element and the voltage output therefrom is a function of a first factor. The voltage divider leg connected to the output of the voltage follower circuit further divides the voltage output by a second factor. The compensation element is connected in the voltage divider leg of the compensation leg means. The voltage output of the conventional leg of the compensation leg means is a function of a second factor and the voltage output from the voltage divider is a function of the first factor. The outputs of the voltage dividers control a power driver means supplying power to the bridge circuit. The output stage of the bridge circuit compares the voltage supplied by the power driver means with a fixed reference voltage to generate an analog signal representing the mass of the air flowing across the sensing element. The symmetrical bridge circuit does not require compensating capacitors and special amplification circuits for the compensation legs.

11 Claims, 6 Drawing Figures

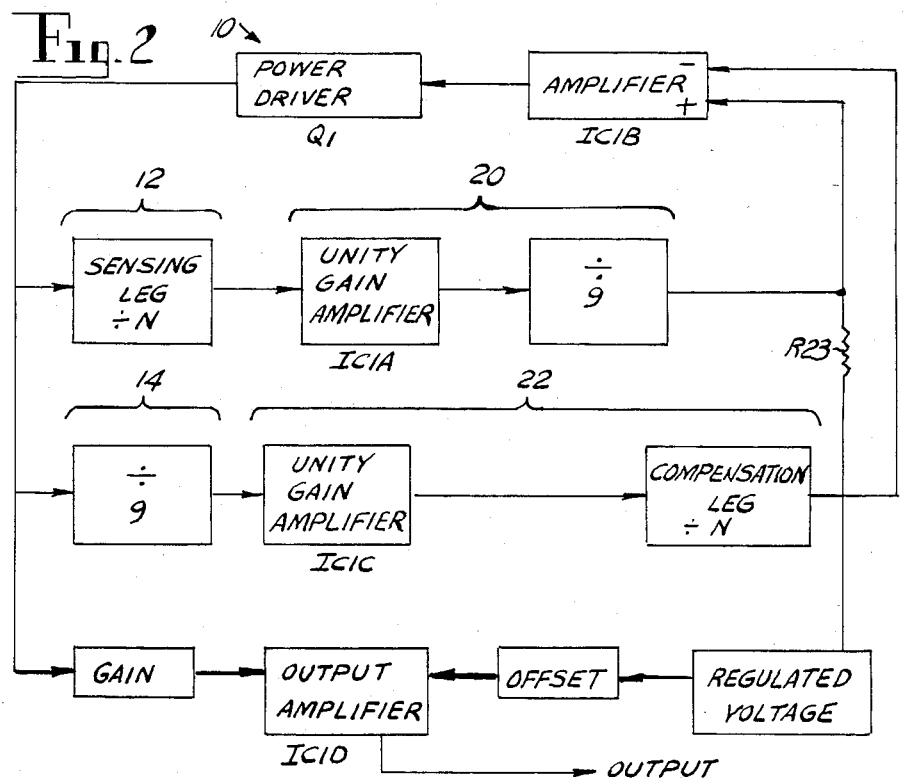
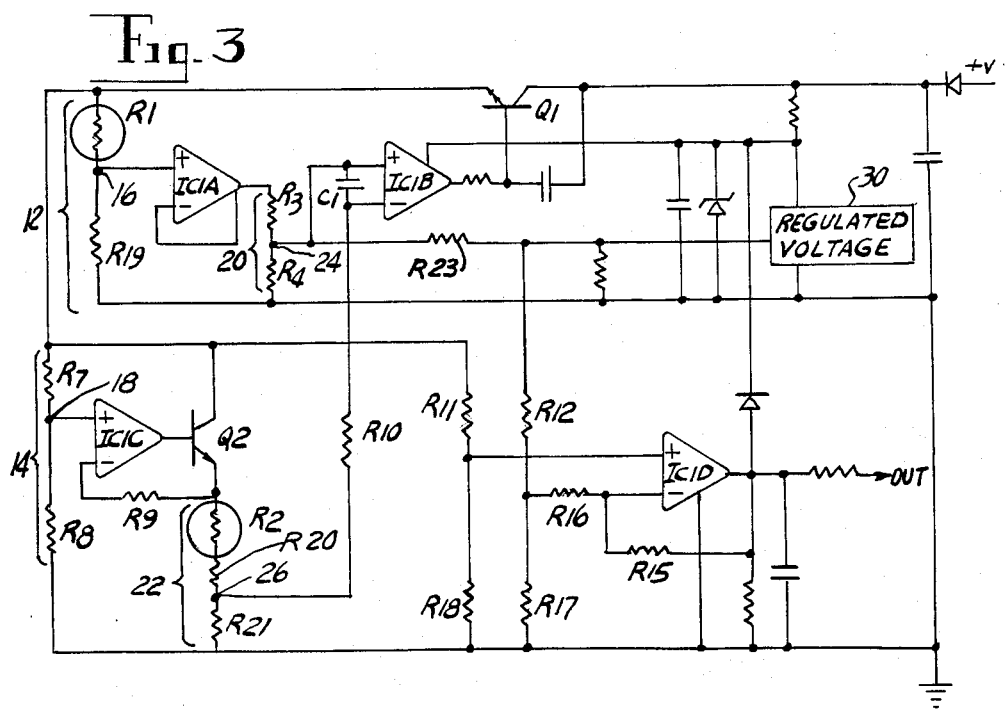

SYMMETRICAL BRIDGE CIRCUIT FOR MEASURING MASS AIR FLOW

This invention relates to a symmetrical bridge circuit for measurements purposes in general and in particular for use in a mass air flow sensor to measure the mass air flow into an internal combustion engine.

BACKGROUND OF INVENTION

The basic measurements in fuel injection systems are the measurements for determining the amount of fuel to be supplied to the engine. Air/fuel ratios are satisfied by measuring the amount of air intake to the engine and then supplying the proper amount of fuel under control of scheduling tables located in the electronic control unit (ECU).

The most common method to determine the amount of fuel to be injected is to measure the manifold pressure and engine speed and from these measurements determine the amount of fuel. Hot wire anemometers and swirl meters are examples of devices for measuring the amount of air flowing into the engine and with this measurement, the amount of fuel is calculated.

In many devices, a bridge circuit is used in the measuring circuitry. In some, a low resistance is used in the heated leg and a high resistance element is used in the unheated leg. In these situations, both elements are operated at the same voltage requiring the matching of the temperature coefficients of the resistance material with the different values of resistance.

A modification of the above mentioned bridge circuit is to divide the voltage to the leg containing the unheated resistance element and then amplify or multiply the voltage output to cancel the division. This generally requires the use of capacitor compensation to assure stability of the gain stage of the amplifier which in turn slows down the circuit response.

Still other solutions have placed the unheated resistance element in the the feedback circuit of an amplifier in the bridge circuit. This requires a number of interactive function adjustments and a regulated voltage reference.

As noted, in each of these, the measurement circuits require various compensation circuits and matching of temperature coefficients of the different measuring elements. To overcome these difficulties, there is disclosed herein a symmetrical bridge circuit not requiring division and multiplication circuits and capacitor compensation where one leg of the the bridge contains a sensing element heated by the circuit. The other leg of the bridge contains a compensation element unheated by the circuit and is used to compensate for air temperature changes.

SUMMARY OF INVENTION

A symmetrical bridge circuit having a sensing leg means and a compensation leg means for measuring mass air flow is electrically connected through a power driver means to a source of power for supplying electrical power to the bridge circuit. The sensing leg means has its input electrically connected to the output of the power driver means, its output electrically connected to the return of the source of power and a control lead intermediate its input and output. The sensing leg means has a sensing element located in the air flow and that is responsive to the rate of the air flowing thereacross for modifying the output from the control lead.

The compensation leg means has its input electrically connected to the output of the power driver means, its output is electrically connected to the return of the source of power and a control lead intermediate its input and output. The compensation leg means has a compensation element located in the air flow and that is responsive to the temperature of the air flowing thereacross for modifying the output from its control lead.

A control amplifier is electrically connected to receive the control leads from both the sensing leg means and the compensation leg means and is operable to control the conduction of the power driver means for supplying power to each of the sensing leg means and the compensation leg means.

The output of the power driver means is also connected through a voltage divider to one input of an output amplifier means for controlling the amount of signal to the output amplifier. The output amplifier has a predetermined fixed gain to match the voltage-flow requirements of the ECU. Another input of the output amplifier is electrically connected to a fixed reference voltage for controlling the offset of the output amplifier. The output signal of the output amplifier is an analog signal representing the mass of the air flowing across the sensing and compensation legs.

DETAILED DESCRIPTION OF THE DRAWINGS

In the drawings:

FIG. 2 is a block diagram of the measuring circuit according to a preferred embodiment of the invention.

FIG. 3 is a schematic of the measuring circuit of FIG. 2.

DETAILED DESCRIPTION

Figure 1A:
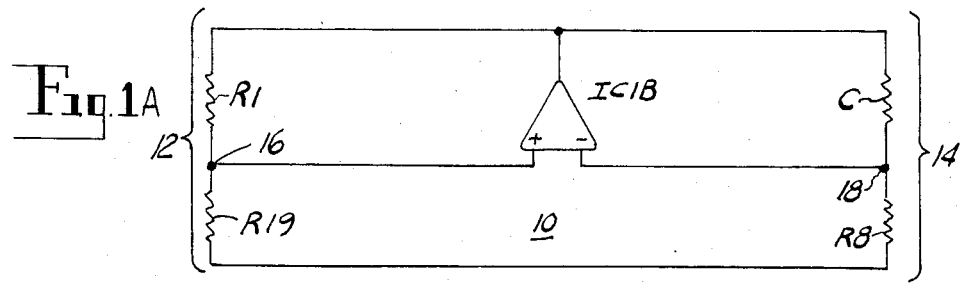
FIG. 1A–1D illustrate the evolution of the symmetrical bridge circuit.

The environment of the preferred embodiment of the invention is that as found in U.S. Pat. No. 4,571,996 entitled Air Flow Sensor having Ser. No. 639,560, filed on Aug. 10, 1984 by Wakeman et.al. This patent is incorporated herein by reference.

FIGS. 1A–1D illustrate the evolution of the functional operation of the symmetrical bridge circuit 10. The voltage to the bridge circuit is supplied to each leg of the bridge and heats both elements. The sensing leg 12 of the bridge contains the sensing element R1 which is positioned in the air flow stream and generally upstream of the compensation sensing element R2. In the present embodiment, this leg divides the voltage across the sensing element R1 by a first factor "N." The first factor "N" is a function of the temperature of the unheated compensation element and at room temperature N equals two. The value of N changes with temperature. As the compensation element changes, N changes and the bridge circuit 10 compensates for temperature changes.

In FIG. 1, the compensation leg 14 of the bridge circuit 10 contains the compensation element C which in the present embodiment divides the voltage thereacross by a second factor which equals nine. It is obvious that the first and second factors are design choice and may differ. However, once the first factor N and the second factor are selected, these factors remain constant in the design.

The control or voltage outputs 16,18 of the sensing and compensation legs are connected to a control amplifier IC1B which operates to control the supplying of voltage to the bridge 10. As the sensing element R1 draws more current, the output of the sensing leg 12 unbalances the amplifier IC1B. The control output of the compensation leg 14 operates to balance the bridge 10 at ambient temperature.

Figure 1B:
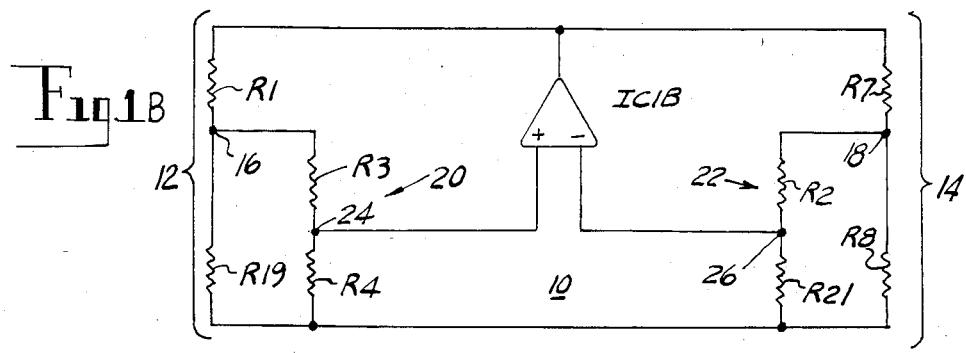

As illustrated in FIG. 1B, electrically coupled between the control amplifier IC1B and the control output 16,18 of each leg 12,14 and second sensing and compensation legs 20,22. The voltage output 16 of the first sensing leg 12 is supplied to the second sensing leg or first voltage divider 20 circuit R3,R4, wherein the voltage is divided by the second factor which as stated above is a factor of nine (9). Therefore the voltage output at the junction 24 of this voltage divider 20 is 1/9 of the voltage output of the first sensing leg 12.

The first compensation leg 14 is modified by placing a resistance R7 in place of the compensation element C so that the voltage output of the first compensation leg is divided by the second factor. The control output of the first compensation leg 14 is supplied to a second compensation leg or second voltage divider 22 circuit R2,R21 including the compensation element. At the junction 26 of the compensation element R2 and the voltage divider resistance R21, the voltage is divided by the first factor.

Figure 1C:
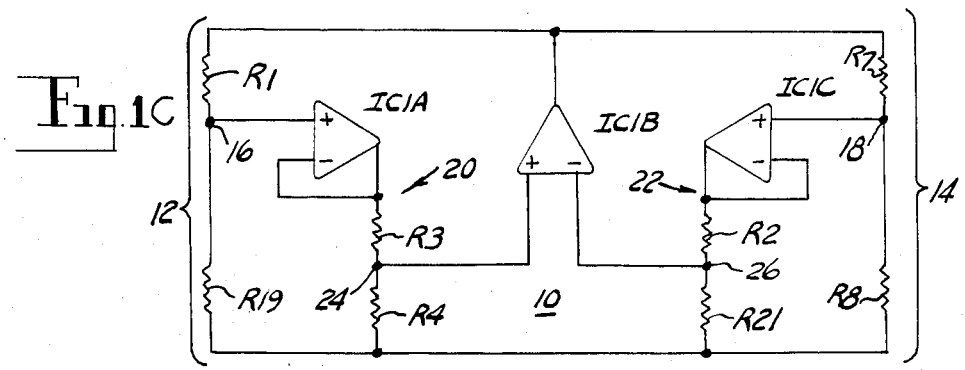

In FIG. 1C, in order to prevent excessive electrical loading on the first legs 12,14 of the bridge, each output 16,18 is electrically connected through a voltage follower amplifier IC1A,IC1C, unity gain amplifiers, to the respective voltage dividers 20,22. The voltage follower amplifiers operate to isolate the voltage dividers 20,22 from the first legs 12,14 and balance the active component delays on each side of the bridge.

Figure 1D:
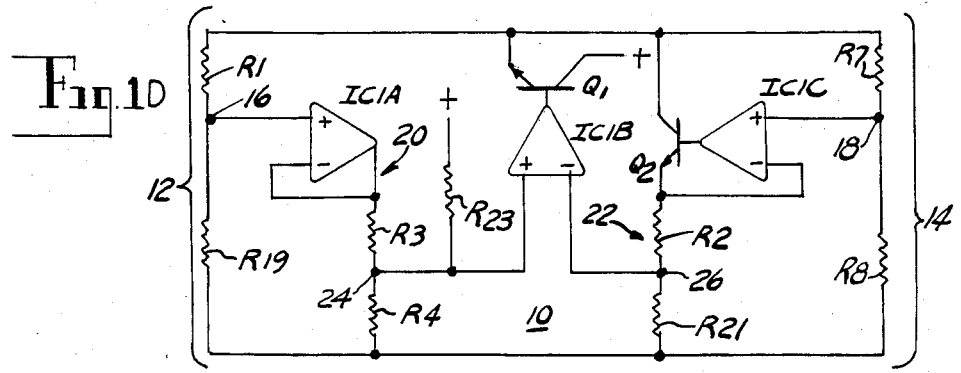

In the circuit shown in FIG. 1C, the control amplifier IC1B used can not supply enough current to the two legs 12,14 of the bridge and the voltage dividers 20,22. Further the voltage follower IC1C cannot supply the current required by the compensation voltage divider 22. There are design considerations only. FIG. 1D illustrates the addition of the power driver means including a power transistor Q1 at the output of the control amplifier IC1B and transistor Q2 at the output of the voltage follower IC1C in the compensation voltage divider 22. As stated above, the transistor Q2 supplies the needed current to the compensation element R2.

As an additional feature, a resistor R23 is added to the noninverting input of the control amplifier IC1B to assure that the noninverting input is positive with respect to the inverting input so that the power transistor Q1 will be turned on and the circuit 10 will start. Thus FIGS. 1A–1D illustrate the basic considerations of the symmetrical bridge circuit 10.

FIG. 2 is block diagram of the several sections of the symmetrical bridge circuit 10. The symmetrical bridge circuit comprises a power driver means for supplying power to the circuit, a sensing leg means having a conventional bridge leg 12 and a voltage divider leg 20, a compensation leg means having a conventional bridge leg 14 and a voltage divider leg 22, a control amplifier means IC1B controlling the power driver means and an output amplifier means IC1D.

Referring to FIG. 3, the preferred embodiment of the symmetrical bridge circuit will be explained. Both the sensing element R1 and the compensation element R2 are nickel resistors having positive temperature coefficients. As previously stated, both elements are located in the air stream of an internal combustion engine. More particularly in the air flow meter, the sensing element R1 is typically located upstream of the compensation element R2.

The sensing element R1 is heated to a predetermined temperature determined by the circuit 10 and the compensation element R2 is not heated by the circuit 10 but is sensitive to the ambient temperature of the air flowing by the compensation element. The symmetrical bridge circuit by controlling the power to the circuit, maintains the temperature of the sensing element R1 at a predetermined temperature above the incoming air temperature.

When the power is applied to the symmetrical bridge circuit, the resistor R23 biases the noninverting input of the control amplifier means IC1B so that its output is high. In the embodiment shown, a high voltage on the base lead of the power driver transistor Q1 turns it on for supplying power to both the sensing and compensation legs 12,14 of the bridge circuit.

In the conventional bridge leg or first sensing leg 12 of the bridge circuit 10, the voltage at the emitter of the power transistor Q1 is applied to a series circuit comprising the sensing element R1 and the resistor R19. The noninverting input of an unity gain amplifier IC1A, a voltage follower, is connected to the junction 16 or the control lead of the sensing element R1 and the resistor R19. The inverting input is directly connected to the output of the amplifier IC1A. As stated previously stated, the values of the resistances R1 and R19, hence voltage at the junction 16 on the control lead is a function of the first factor N which in this embodiment is two.

The voltage at the output of the power transistor Q1 is also applied to the conventional bridge leg of the compensation leg means which is a series circuit comprising resistors R7 and R8. The value of the resistors is a function of the second factor which in the preferred embodiment is nine with resistor R7 equal to approximately nine times the value of the resistor R8. The voltage at the junction 18 or on the control lead is equal to 1/9 the supply voltage. The noninverting input of an amplifier IC1C, whose output is connected to the base lead of a transistor Q2, is connected to the junction 18 of the two resistors R7 and R8. The collector lead of the transistor Q2 is electrically connected to the output of the power transistor Q1 and the emitter lead is connected through a feedback resistor R9 to the inverting input of the amplifier IC1C. The purpose of this transistor is to supply power to the second compensation leg 22.

As previously indicated the amplifiers IC1A and IC1C are configured as voltage followers to reduce the electrical loading on the conventional bridge legs or first sensing 12 and compensation 14 legs of the bridge circuit 10 respectively.

The second sensing leg or first voltage divider leg 20 of bridge circuit 10 comprises the series circuit of resistors R3 and R4. As previously indicated the voltage at the junction 24 or control lead of these resistors R3 and R4 is a function of the second factor and in the preferred embodiment is equal to 1/9 of the voltage output of the amplifier IC1A. The value of the resistor R3 is nine times the value of the resistor R4. The junction 24 of the two resistors R3 and R4 is electrically connected to the noninverting input of the control amplifier means IC1B.

The second compensation leg or second voltage divider leg 22 of bridge circuit 10 comprises, compensation element R2 and a pair of resistors R20 and R21.

The junction 26 of the resistors R20 and R21 is electrically connected to the inverting input of the control amplifier means IC1B. The relationship between all of the resistance values in the second voltage divider circuit 22 is a function of the first factor N. In the preferred embodiment the total resistance in the upper portion of the voltage divider is R2+R20. R2, by design, has a value equal to ten ohms at room temperature of the value of R20 is one-half the value of R2 or five ohms. The value of R21 must be such that the voltage at the junction is a function of the first factor N. Thus, with the first factor N equal to two, the value of R21 is equal to (R2+R20) or fifteen ohms.

For the symmetrical bridge circuit 10 to balance, the voltage on the noninverting input of the control amplifier IC1B must be equal to the voltage on its inverting input. The output voltage at the junction 26 of the compensation leg means 14,22 side of the bridge circuit is equal to a function of the first and second factors which in this example is 1/18 of the supply voltage.

In the first sensing leg 12 of the bridge circuit 10, the value of the resistor R19 is 1.5 times the unheated resistance value of the sensing element R1. As the power driver means supplies more current to R1, the resistance of the sensing element R1 increases until $R1/R2 = [(R2+R20)/R21]$. The output of the voltage divider circuit 20 through the amplifier IC1B will control the power driver means to balance the symmetrical bridge circuit.

OPERATION OF THE PREFERRED EMBODIMENT

When the velocity of the air increases, the resistance of the sensing element R1 decreases as its temperature is reduced by heat conduction to the passing air. This increases the voltage at the noninverting input of the voltage follower amplifier IC1A. The output of the voltage follower amplifier IC1A is supplied through the voltage divider 20 comprising the two resistors R3 and R4 to the noninverting input of the control amplifier IC1B. This causes the output of the control amplifier IC1B to increase thereby driving the power transistor Q1 to supply more power to the sensing resistor R1. This increases the resistance value of the sensing resistor R1 until the bridge balances.

The output signal from the symmetrical bridge circuit is from the amplifier IC1D. The noninverting input of the output amplifier IC1D is connected a voltage divider comprising two resistances R11 and R18 connected to the output of the power driver means. This voltage divider functions as the gain control of the output amplifier IC1D and as the junction of the two resistances R11 and R18 changes accordingly. The inverting input of the output amplifier IC1D is connected to a voltage divider comprising two resistances R12 and R17 connected to a regulated voltage. This voltage divider functions as the offset control of the output amplifier IC1D. The output of the amplifier IC1D, which is an analog voltage signal is connected in a feedback circuit comprising resistance R15, R16 to its inverting input. The function of the feedback circuit is to set the gain of amplifier.

The temperature coefficient of the nickel sensing and compensation elements R1,R2 is approximately +5420 parts per million per degree centigrade. Therefor a temperature increase of 75° C., will increase the resistance of the sensing element by 50%. As the temperature of the air increases, the resistance of compensation element R2 changes, changing the ratio of that leg to the bridge. The amount of voltage across the sensing element R1 is increased to maintain the 75° C. temperature differential while keeping the voltage at the emitter of the power transistor Q1 constant for a given air flow.

The voltage across the compensation element R2 is, in preferred embodiment, approximately 1/12th of the voltage across the sensing element R1. The power delivered to the compensation element R2 is 0.5 mw while the power delivered to the sensing element R1 is about 75 mw at very low air flow rate. The power ratio of the sensing to the compensation elements is about 150:1.

Several features of the symmetrical bridge circuit are the use of the same type of element in the both the sensing and the compensation elements; no amplification of the output of the compensation leg therefor circuit stability is enhanced; having the phase lag the same in both bridge legs thereby avoiding the need for compensating capacitors for keeping the circuit stable which slows down the circuit operation; no adjustments of the sensing and compensation loops are needed; and for fabrication purposes, a single, inexpensive integrated circuit element is used and thick film techniques may be used since the design depends on the ratio of the resistors.

There has thus been shown and described a symmetrical bridge circuit for use in mass air flow sensors as may be found in control systems for internal combustion engines.

What is claimed is:

1. A symmetrical bridge circuit for measuring mass air flow comprising:
    power driver means electrically connected to a source of power for supplying electrical power;
    sensing leg means including a first sensing leg and a second sensing leg, said sensing leg means having a sensing element located in the air flow and responsive to the rate of the air flowing across said sensing element, each of said first and second sensing legs having an input, an output and a control lead intermediate said input and output;
    compensation leg means including a first compensation leg and a second compensation leg, said compensation leg means having a compensation element located in the air flow and responsive to the temperature of the air flow, each of said first and second compensation legs having an input, an output and a control lead intermediate said input and output;
    a control amplifier electrically coupled to the control leads from each of said second sensing leg and said compensation leg and operable to control the output of said power driver means for supplying power to the input of said sensing leg means and said compensation leg means; and
    an output amplifier means responsive to the output of said power driver means for generating a signal representing the mass of the air flowing across said sensing and compensation elements.

2. A symmetrical bridge circuit for measuring mass air flow according to claim 1 wherein the output at said control lead of said first sensing leg is a voltage signal that is a function of a first factor and the output at said control lead of said second sensing leg is a voltage signal that is a function of a second factor.

3. A symmetrical bridge circuit for measuring mass air flow according to claim 2 wherein the output at said control lead of said first compensation leg is a voltage signal that is a function of said second factor and the output at said control lead of said second compensation leg is a voltage signal that is a function of said first factor.

4. A symmetrical bridge circuit for measuring mass air flow according to claim 3 wherein said first factor changes with temperature and is a function of said compensation element thereby providing temperature compensation for the bridge circuit.

5. A symmetrical bridge circuit for measuring mass air flow according to claim 1 wherein said second sensing leg is a first voltage divider network between the control lead of said first sensing leg and one input of said control amplifier and said second compensation leg is a second voltage divider network between the control lead of said first compensation leg and the other input of said control amplifier.

6. A symmetrical bridge circuit for measuring mass air flow according to claim 5 wherein said compensation sensing element is electrically connected in said second voltage divider network.

7. A symmetrical bridge circuit for measuring mass air flow according to claim 5 additionally including voltage follower means electrically connected between said control leads of said first sensing and compensation legs respectively to said inputs of said first and second voltage divider networks.

8. A symmetrical bridge circuit for measuring mass air flow according to claim 1 additionally including means electrically connected to one input of said control amplifier means for causing said control amplifier to turn on said power driver means when voltage is initially applied to the symmetrical bridge circuit.

9. A symmetrical bridge circuit for measuring mass air flow according to claim 1 wherein said sensing element and said compensation element are fabricated from the same type of material having the same temperature coefficients.

10. A symmetrical bridge circuit for measuring mass air flow according to claim 1 wherein said output amplifier means has one input electrically coupled to the output of said power driver means for controlling the gain of said output amplifier and having another input electrically coupled to a fixed reference voltage for controlling the offset of said output amplifier.

11. A symmetrical bridge circuit for measuring mass air flow comprising:
a sensing element and a compensation element having the same temperature coefficients;
power driver means elastically connected to a source of power for supplying electrical power;
sensing leg means including a first sensing leg and a second sensing leg, said first sensing leg including said sensing element located in the air flow and responsive to the rate of the air flowing across said sensing element, said first sensing leg means having its input electrically connected to the output of said power driver means, its output electrically connected to the return of the source of power and a control lead intermediate said input and output connected to the input of said second sensing leg, said first sensing leg ratio a function of a first factor and said second sensing leg ratio a function of a second factor;
compensation leg means including a first compensation leg and a second compensation leg including said compensation element located in the air flow and responsive to the temperature of the air flow, said first compensation leg means having its input electrically connected to the output of said power driver means, its output electrically connected to the return of the source of power and a control lead intermediate said input and output connected to the input of said second compensation leg, said first compensation leg ratio a function of said second factor and said second compensation leg ratio a function of said first factor;
a control amplifier electrically coupled to the control leads from said second sensing leg and said second compensation leg and operable to control the output of said power driver means for supplying power to each of said sensing leg means and said compensation leg means, said control amplifier having means electrically connected to one input thereof for causing said control amplifier to turn on when said source of power is applied to the symmetrical bridge circuit; and
an output amplifier means responsive to the output of said power driver means for generating a signal representing the mass of the air flowing across said sensing and compensation elements.

* * * * *